US007203469B2

(12) United States Patent
Yamaguchi et al.

(10) Patent No.: US 7,203,469 B2
(45) Date of Patent: Apr. 10, 2007

(54) SUPERGAIN ARRAY ANTENNA SYSTEM AND METHOD FOR CONTROLLING SUPERGAIN ARRAY ANTENNA

(75) Inventors: Ryo Yamaguchi, Kanagawa (JP); Noriyoshi Terada, Yokohama (JP); Toshio Nojima, Sapporo (JP)

(73) Assignee: NTT DoCoMo, Inc., Tokyo (JP)

( * ) Notice: Subject to any disclaimer, the term of this patent is extended or adjusted under 35 U.S.C. 154(b) by 457 days.

(21) Appl. No.: 10/310,971

(22) Filed: Dec. 6, 2002

(65) Prior Publication Data

US 2004/0009793 A1 Jan. 15, 2004

(30) Foreign Application Priority Data

Dec. 12, 2001 (JP) ............................ 2001-379209

(51) Int. Cl.
*H04B 1/04* (2006.01)

(52) U.S. Cl. .................................... 455/132; 455/127.2

(58) Field of Classification Search ............. 455/226.3, 455/231, 562.1, 132, 189.1, 136; 343/824; 370/276, 294, 288, 293
See application file for complete search history.

(56) References Cited

U.S. PATENT DOCUMENTS 3,766,559 A * 10/1973 Butcher et al. ............. 342/368
6,735,182 B1 * 5/2004 Nishimori et al. .......... 370/294

* cited by examiner

*Primary Examiner*—Edward F. Urban
*Assistant Examiner*—Tu Nguyen
(74) *Attorney, Agent, or Firm*—Crowell & Moring LLP

(57) ABSTRACT

To provide a super directional gain in a multi-element array antenna. An array antenna comprising a plurality of antenna elements A-1–A-4 spaced at intervals (equal to or less than a quarter of a wavelength) that provides a supergain is used. A weight generator circuit generates weight data in accordance with phase difference and amplitude difference among the antenna elements A-1–A-4 and directivity data of each of the antenna elements A-1–A-4. The generated weight data is used to weight each of the antenna elements A-1–A-4.

11 Claims, 9 Drawing Sheets

SUPERGAIN ARRAY ANTENNA SYSTEM AND METHOD FOR CONTROLLING SUPERGAIN ARRAY ANTENNA

BACKGROUND OF THE INVENTION

1. Field of the Invention

The present invention relates to a supergain array antenna system and a method for controlling the supergain array antenna. More particularly, it relates to a supergain array antenna system that is compact and can provide a high directional gain and a method for controlling the supergain array antenna.

2. Description of the Related Art

In general, if an array antenna is downsized, the gain thereof will be reduced because the aperture area (aperture length) thereof is also reduced. However, such a gain reduction can be suppressed if antenna elements are packed in the reduced area (length) at narrow intervals and particular phase relation and amplitude relation are given to the elements. Antennas having the gain reduction thus suppressed are known as supergain antennas. A supergain antenna has a directional gain much higher than normal, and the principle thereof has been known since along time ago. For example, such a supergain antenna is described in “A new approach to the design of Super directive aerial arrays” by Bloch A, Medhurst A and Pool S (proc., Inst., Electr., Eng., 100, Part III, 67, p. 303 (September 1953)) and “Antenna Engineering Handbook” edited by the Institute of Electronics, Information and Communication Engineers, p. 211 (1980). However, it has not been put into practical use because of its severe physical constraints or the like as described below.

FIG. 9(*a*) shows a configuration of an array antenna. The array antenna shown in FIG. 9(*a*) comprises four antenna elements A-1–A-4. Signals received by the four antenna elements A-1–A-4 are output after RF (radio frequency) synthesis.

FIG. 9(*b*) shows a directional gain versus direction (referred to as a directivity pattern) of the array antenna thus arranged.

If a normal in-phase synthesis is applied to the array antenna having a narrow element interval (for example, about a quarter of a wavelength λ, which is abbreviated as λ/4, hereinafter) as shown in FIG. 9(*a*), the directional gain is reduced as the element interval decreases. That is, if a normal in-phase synthesis is applied to the array antenna having a narrow element interval, the directional gain is reduced as the element interval decreases as shown by broken lines in FIG. 10. The directivity pattern and a return loss (S11) in this case are shown in FIGS. 9*b* and 9*c*, respectively.

On the other hand, as shown in FIG. 11(*a*), a supergain antenna is provided in which the antenna elements A-1–A-4 are powered with the phases thereof being inverted alternately. As is known, if such a supergain antenna includes N antenna elements (N being 2 or an integer greater than 2) and the N antenna elements are spaced at intervals close to 0, a directional gain of $N^2$ is provided. That is, as shown by solid lines in FIG. 10, two elements provide a directional gain of $2^2=4$, three elements provide a directional gain of $3^2=9$, and four elements provide a directional gain of $4^2=16$. The directivity pattern and the return loss (S11) in this case are shown in FIGS. 11*b* and 11*c*, respectively. FIGS. 11*b* and 11*c* show that the supergain antenna has reduced beam width and bandwidth.

However, since the supergain antenna has an increased power radiation to an invisible region in compensation for its higher gain, it has an increased Q value. Therefore, the conductor loss in the antenna including the power supply unit is increased and the efficiency of the antenna decreases. Here, the Q value is expressed as Q=D/F, where character D indicates a directional gain and character F indicates an efficiency coefficient.

To prevent the efficiency reduction of the antenna, the antenna and the power supply circuit are cooled down to reduce the conductor loss. That is, in FIG. 11(*a*), the N antenna elements are housed in a thermostatic container and a cooling device is provided.

In addition, the supergain antenna has a reactive power in the vicinity thereof that is much higher than the radiated power. Therefore, it has an extremely narrow band.

Furthermore, phase and amplitude relations among the antenna elements required to provide a supergain is quite sensitive, and even a small phase shift could disturb the supergain condition. For example, only 1 degree of phase shift of an antenna element would result in loss of supergain. Generation of the sensitive phase and amplitude, or RF synthesis, is difficult using a power supply circuit, such as a microstrip line, because of its physical constraints (fabrication precision, stability). The difficulty becomes higher as the number of antenna elements increases.

An example of the supergain antenna using two-element helical antenna has been reported. However, it essentially requires delicate adjustment of a matching circuit required for RF synthesis, and therefore, it is difficult to use a large number of elements in the supergain antenna. This is described in “High-Tc Superconducting Small Antennas” by K. Itoh, O. Ishi, Y. Nagai, N. Suzuki, Y. Kimachi and O. Michikami (IEEE Trans. Applied Superconductivity, Vol. 3, No. 1, March 1993). Thus, no example of a multi-element array that provides a supergain has been reported.

Beside, if fixed phase and amplitude are given by the power supply circuit (RF synthesis), the whole antenna system would have a narrow band, and the system including a receiver would also have a narrow band. As a result, a problem arises in that the antenna cannot be applied to a wide band communication system.

Furthermore, there is a significant problem concerning directivity synthesis. Since the supergain array antenna has the antenna elements spaced at quite narrow intervals, the elements are electromagnetically strongly coupled to each other and therefore have non-uniform directivities. To the contrary, in an array antenna having an element interval of about λ/2 or more, elements other than those at both ends have a substantially uniform directivity, and directivity synthesis can be implemented without hindrance. Since the supergain synthesis requires such a phase relation that adjacent elements have inverted phases, the directivity of each of the elements is an important design factor. That is, to provide phase and amplitude that realize a supergain, the directivity of each element in operation is needed.

Mathematically, by assuming a nondirectional antenna, phase and amplitude that realize a supergain can be found. However, the elements are electromagnetically coupled to each other in actual, and therefore, the supergain cannot be realized if the values found are applied to a directional antenna.

According to the conventional synthesis method (RF synthesis) using a power supply circuit, directivities of mounted elements connected to the power supply circuit that gives operation conditions, that is, phases and amplitudes to the elements cannot be measured, and therefore, supergain synthesis taking the element directivities into account is difficult.

As described above, it has been technically difficult to design multi-element, high-precision and wide-band supergain antenna system hardware taking into account all of a plurality of design factors.

SUMMARY OF THE INVENTION

The present invention has been devised to solve the problems of the prior art described above. Objects of the invention is to provide a super directional gain for a multi-element array antenna, to realize supergain synthesis with a higher precision taking into account directivities of elements, and to provide a supergain array antenna system that can assure a wide band for the whole antenna system and a method for controlling a supergain array antenna.

A supergain array antenna system as claimed in claim 1 of the invention is a supergain array antenna system having an array antenna, the array antenna comprising a plurality of antenna elements and having an element interval that provides a supergain, characterized in that the supergain array antenna system comprises: weight generator means for generating weight data in accordance with each of directivity data for the plurality of antenna elements of said array antenna; and weighting means for using the weight data generated by the weight generator means to weight the plurality of antenna elements of said array antenna.

A supergain array antenna system as claimed in claim 2 of the invention is the supergain array antenna system as claimed in claim 1, characterized in that said element interval that provide a supergain is equal to or less than a quarter of a wavelength of a signal received and/or transmitted.

A supergain array antenna system as claimed in claim 3 of the invention is the supergain array antenna system as claimed in claim 1 or 2, characterized in that said weigh generator means generates weight data that maximizes a signal-to-noise ratio.

A supergain array antenna system as claimed in claim 4 of the invention is the supergain array antenna system as claimed in any one of claims 1 to 3, characterized in that said weight generator means performs calibration for the plurality of antenna elements, storage of directivity data resulting from the calibration, and weight calculation in which said weight data is calculated by referring to the stored directivity data.

A supergain array antenna system as claimed in claim 5 of the invention is the supergain array antenna system as claimed in any one of claims 1 to 4, characterized in that a signal system for said array antenna is separated into a plurality of sub-systems, and said weight generator means is provided for each of the plurality of signal sub-systems.

A supergain array antenna system as claimed in claim 6 of the invention is the supergain array antenna system as claimed in any one of claims 1 to 4, characterized in that a signal system for said array antenna is separated into a transmission signal sub-system and a reception signal sub-system, and said weight generator means is shared by the separate transmission signal sub-system and reception signal sub-system.

A supergain array antenna system as claimed in claim 7 of the invention is the supergain array antenna system as claimed in any one of claims 1 to 4, characterized in that said array antenna is provided for each of transmission and reception, and weight data generated by the weight generator means shared by the array antennas is used to weight a plurality of antenna elements of the array antennas.

A method for controlling a supergain array antenna as claimed in claim 8 of the invention is a method for controlling an array antenna comprising a plurality of antenna elements and having an element interval that provides a supergain, characterized in that the method comprises: a weight generating step of generating weight data in accordance with each of directivity data for the plurality of antenna elements of said array antenna; and a weighting step of using the weight data generated in the weight generating step to weight the plurality of antenna elements of said array antenna.

A method for controlling a supergain array antenna as claimed in claim 9 of the invention is the method for controlling a supergain antenna as claimed in claim 8, characterized in that said element interval that provide a supergain is equal to or less than a quarter of a wavelength of a signal received and/or transmitted.

A method for controlling a supergain array antenna as claimed in claim 10 of the invention is the method for controlling a supergain antenna as claimed in claim 8 or 9, characterized in that in said weigh generating step, weight data that maximizes a signal-to-noise ratio is generated.

A method for controlling a supergain array antenna as claimed in claim 11 of the invention is the method for controlling a supergain antenna as claimed in any one of claims 8 to 10, characterized in that in said weight generating step, calibration for the plurality of antenna elements, storage of directivity data resulting from the calibration, and weight calculation, in which said weight data is calculated by referring to the stored directivity data, are performed.

In short, in the system according to the invention, there is realized a multi-element and wide-band supergain array antenna that provides a supergain by digital beam synthesis and comprises an array antenna having elements spaced at intervals that provide a supergain, receivers connected to the respective elements, a device that records and accumulates therein element directivity data for each element, and a supergain synthesis circuit.

DETAILED DESCRIPTION OF THE PREFERRED EMBODIMENTS

Figure 1A:
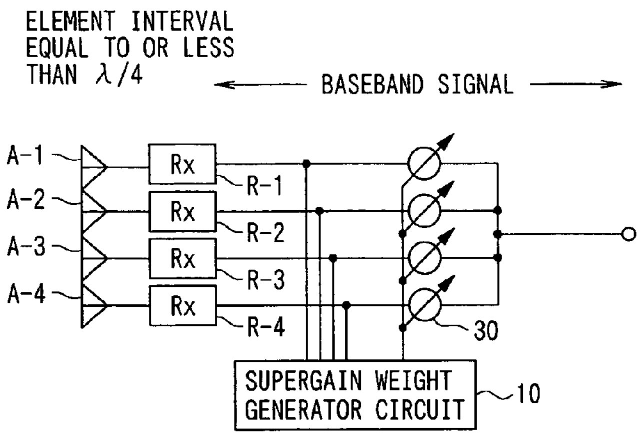
FIG. 1(*a*) is a block diagram showing a first embodiment of a supergain array antenna system according to the invention, FIG. 1(*b*) shows a directivity pattern thereof, and FIG. 1(*c*) shows a return loss characteristic thereof.

Now, embodiments of the present invention will be described with reference to the accompanying drawings. The same parts are assigned the same reference numerals throughout the drawings referred to in the following description. In the following, embodiments of a supergain array antenna system according to the invention will be described with reference to FIGS. 1 to 8.

(First Embodiment)

Figure 1B:
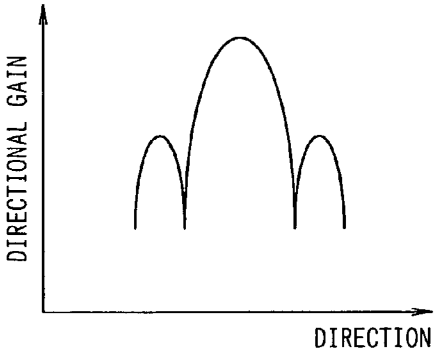
Figure 1C:
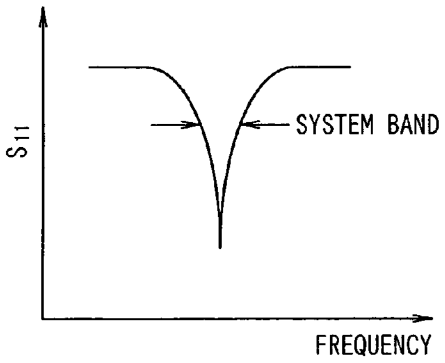

FIGS. 1(*a*) to 1(*c*) show a configuration of a first embodiment of a supergain array antenna system according to the invention. FIG. 1(*a*) shows an array antenna of an element interval equal to or less than λ/4. The array antenna has four elements. The antenna elements A-1–A-4 in the array antenna have respective receivers (Rx) R-1–R-4 attached thereto. The receivers R-1–R-4 are to convert RF analog signals received by the respective antenna elements into baseband digital signals.

Antenna element data are transferred to a supergain weight generator circuit 10 and processed and stored as calibration and element directivity data. The supergain weight generator circuit 10 generates weight data for a desired radiation direction based on the directivity data. The generated weight data are passed to weighting units 30, where outputs of the receivers R-1–R-4 are multiplied by the weight data, respectively. The baseband signals after multiplication are synthesized and then output.

Figure 2:
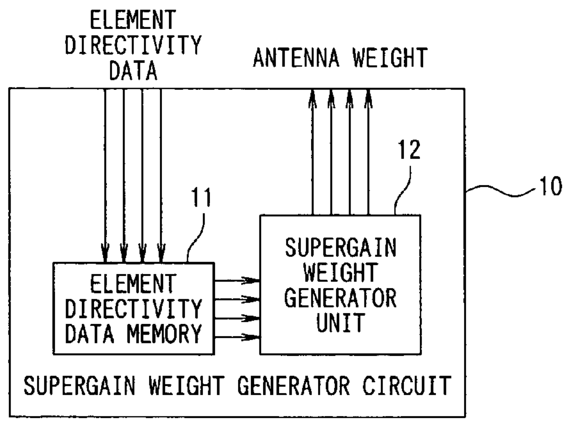
FIG. 2 is a block diagram showing a configuration of a supergain weight generator circuit shown in FIG. 1.

Here, the supergain weight generator circuit 10 operates in such a manner as to provide a maximum signal-to-noise ratio (abbreviated as SNR, hereinafter) of the antenna. A configuration of the supergain weight generator circuit 10 will be described with reference to FIG. 2. As shown in FIG. 2, the supergain weight generator circuit 10 comprises an element directivity data memory 11 and a supergain weight generator unit 12. The supergain weight generator circuit 10 receives the element directivity data and outputs the antenna weight data.

Figure 3:
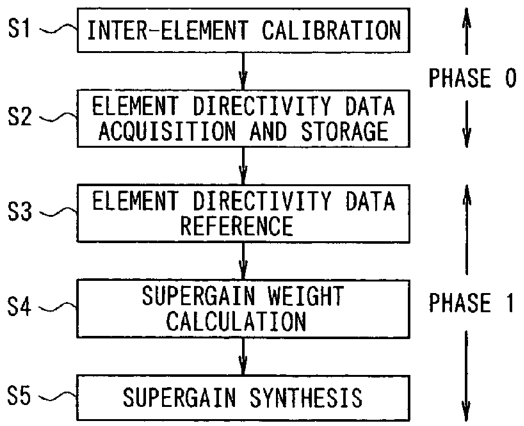
FIG. 3 shows a procedure performed by the supergain weight generator circuit shown in FIG. 1.

A procedure of supergain synthesis in the supergain weight generator circuit 10 will be described with reference to FIG. 3. As shown in FIG. 3, the procedure of supergain synthesis comprises a phase 0 and a phase 1, the phase 0 further comprises inter-element calibration S1 and element directivity data acquisition and storage S2, and the phase 1 further comprises element directivity data reference S3, supergain weight calculation S4 and supergain synthesis S5.

First, in the phase 0, inter-element calibration S1 and element directivity data acquisition and storage S2 are performed. For synthesis of the array antenna in a baseband (digital beam forming), it is required that the antenna elements use a same transfer function in a path where inputs received by the antenna elements are converted into the baseband. When receiving a radio wave, a phase difference and an amplitude difference occurring between the antenna elements are difficult to maintain in the baseband. Therefore, the phase difference and amplitude difference between the antenna elements are measured (S1) and stored (S2). The stored data is to be used for correction in operation.

Figure 4:
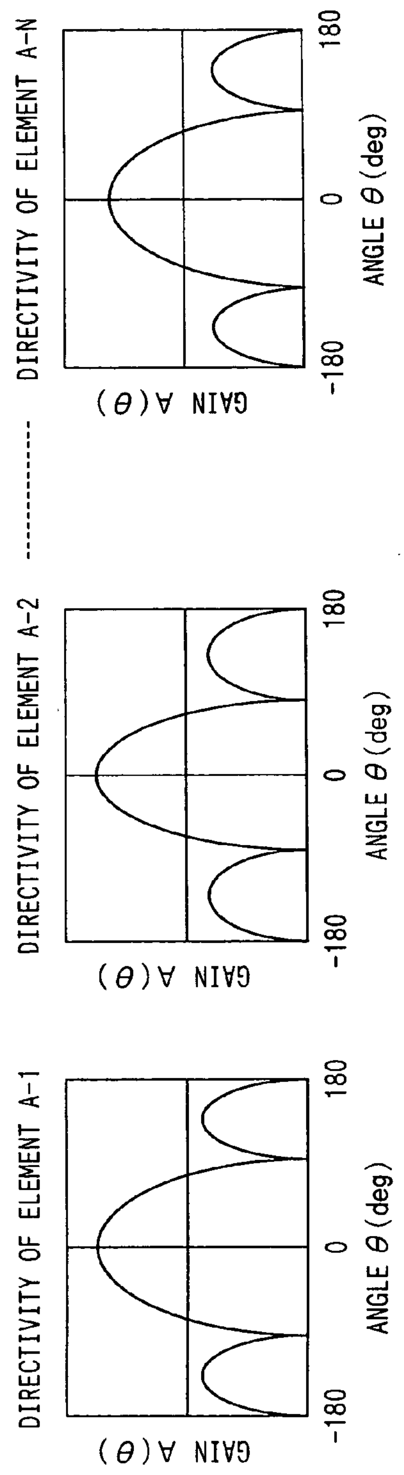
FIG. 4 shows an example of directivity data for each of antenna elements.

Stored data in the element directivity data memory 11 are data (digital data) of directivity patterns for the antenna elements A-1–A-4 in the array antenna, as shown in FIG. 4. In FIG. 4, the lateral axis indicates an angle (front of the antenna is zero degreee) and the longitudinal axis indicates a directional gain.

Figure 5:
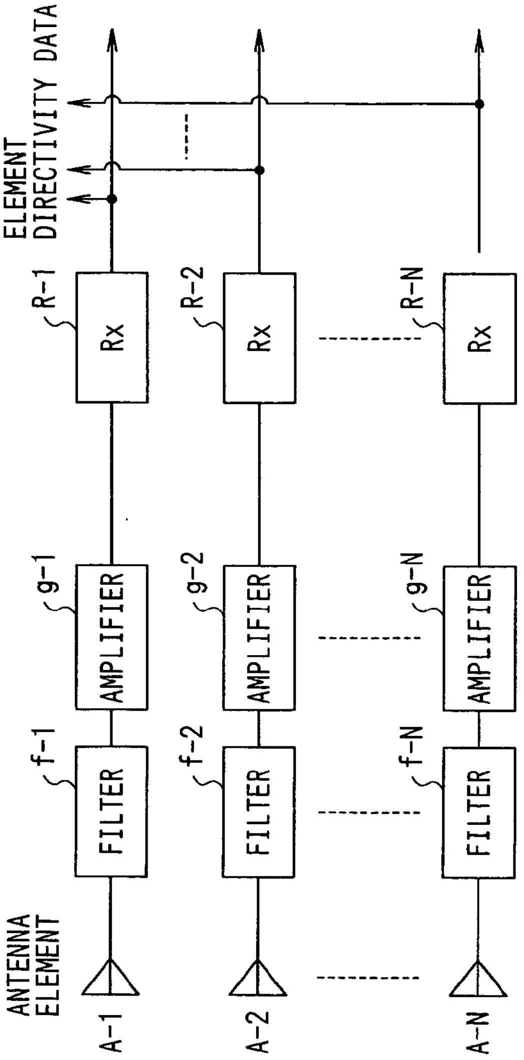
FIG. 5 shows an arrangement intended for calibration between the elements.

Specifically, an arrangement shown in FIG. 5 is used to measure and store the phase difference and amplitude difference between the antenna elements A-1–A-4. The receivers R-1–R-N are provided for the antenna elements A-1–A-N, respectively. Filters f-1-f-N and amplifiers g-1–g-N are provided between the antenna elements A-1–A-N and the receivers R-1–R-N, respectively. In the arrangement, the analog signals received by the antenna elements A-1–A-N are converted into baseband signals by the filters f-1 to f-N, the amplifiers g-1–g-N and the receivers R-1–R-N, respectively, to provide element directivity data. The data is to be stored in the element directivity data memory 11.

As described above, in inter-element calibration S1 and element directivity data acquisition and storage S2, that is, in the phase 0, the directivity patterns described above are measured beforehand and stored in the element directivity data memory 11.

Next, processings performed in the supergain weight generator unit 12 shown in FIG. 2, that is, element directivity data reference S3, supergain weight calculation S4 and supergain synthesis S5 in FIG. 3 will be described. In these processings, that is, in the phase 1, the element directivity data stored in the element directivity data memory 11 are referred to, thereby producing weight data that provide a maximum SNR for the array antenna.

In the system according to the invention, as a method for providing a maximum SNR for the array antenna, a method is adopted which is described in "A Survey of Possible Passive Antenna Application of High-Temperature Superconductors" by Robert J. Dinger, Donald R. Bowling and Anna M. Martin, IEEE TRANSACTIONS ON MICROWAVE THEORY AND TECHNIQUES, VOL. 39, NO. 9, p. 1503 (September 1991). The method for calculating weight data that provide a maximum SNR described in the literature will be described below.

First, a directivity function f(θ), which is a function of an angle θ, is expressed as the following formula (1).

Formula 1

$$f(\theta) = \sum_{n=1}^{N} W_n e^{jk(n-1)d\sin\theta} \tag{1}$$

In this formula, $W_n = A_n e^{j}\theta$, and $k=2\pi/\lambda$ (symbol λ indicates a wavelength). The weight $W_n$ in the formula (1) can be expressed by the vector $W_n$ in the following formula (2).

Formula 2

$$W=[W_1 W_2 \ldots W_n]^T \tag{2}$$

In the formula (2), symbol T indicates a transposed matrix. Assuming that element directivity data is expressed as $A_n(\theta)$, a signal vector is expressed as the following formula (3).

Formula 3

$$S=[A_1(\theta)A_2(\theta)e^{jkd\sin\theta}A_3(\theta)e^{j2kd\sin\theta}\ldots A^N(\theta)e^{j(N-1)kd\sin\theta}]^T \quad (3)$$

Simplifying the formula (1), the following formula (4) results.

Formula 4

$$f(\theta)=W^T S \quad (4)$$

A signal output power, which is a function of an angle θ, is expressed as the following formula (5).

Formula 5

$$P(\theta)=|W^T S|^2=W^{*T}PW \quad (5)$$

Here, symbol P in the right side of the formula (5) indicates a cross-spectral density matrix, which is a tensor product expressed as P=SS*.

On the other hand, a noise output power is expressed as the following formula (6).

Formula 6

$$P_n=W^T RW \quad (6)$$

Here, symbol R in the right side of the formula (6) indicates a noise covariance matrix, which is expressed as the following formula (7).

Formula 7 (7)

$$R_{ij}=\int n_i^*(t)n_j(t)dt$$

(7)

In the formula (7), term $n_i(t)$ indicates noise for an element i, which is a function of time (t). Combining the formulas (5) and (6), SNR(θ), which is a function of an angle θ, is expressed as the following formula (8).

Formula 8 (8)

$$SNR(\theta)=\frac{W^{*T}PW}{W^{*T}RW}$$

(b 8)

The weight W that maximizes the SNR(θ) given by the formula (8) is expressed as the following formula (9).

Formula 9 (9)

$$W_{opt}=R^{-1}S_0^*$$

(9)

The weight data $W_{opt}$ is expressed as the following formula (10).

Formula 10 (10)

$$W_{opt}=[R+\varepsilon 1]^{-1}S_0^*$$

(10)

Antenna Q is expressed as the following formula (11).

Formula 11 (11)

$$Q=\frac{W_{opt}^{*T}W_{opt}}{W_{opt}^{*T}RW_{opt}}$$

(11)

This procedure described so far is equivalent to the element directivity data reference S3 and supergain weight calculation S4 in FIG. 3. The weight data $W_{opt}$ given by the above-described formula (10) is used to perform the supergain synthesis S5 in FIG. 3.

As described above, with the system according to the invention, the array antenna of a narrow element interval (the element interval can provide a supergain), the supergain weight generator circuit and the baseband receiving and synthesis system can provide a supergain antenna having a directivity pattern shown in FIG. 1(*b*) and a return loss characteristic shown in FIG. 1(*c*).

While FIGS. 1(*a*) to 1(*c*) show a linear arrangement of the array antennas, this embodiment can apparently be applied to any arrangement, such as an annular arrangement and a planar arrangement.

(Second Embodiment)

Figure 6A:
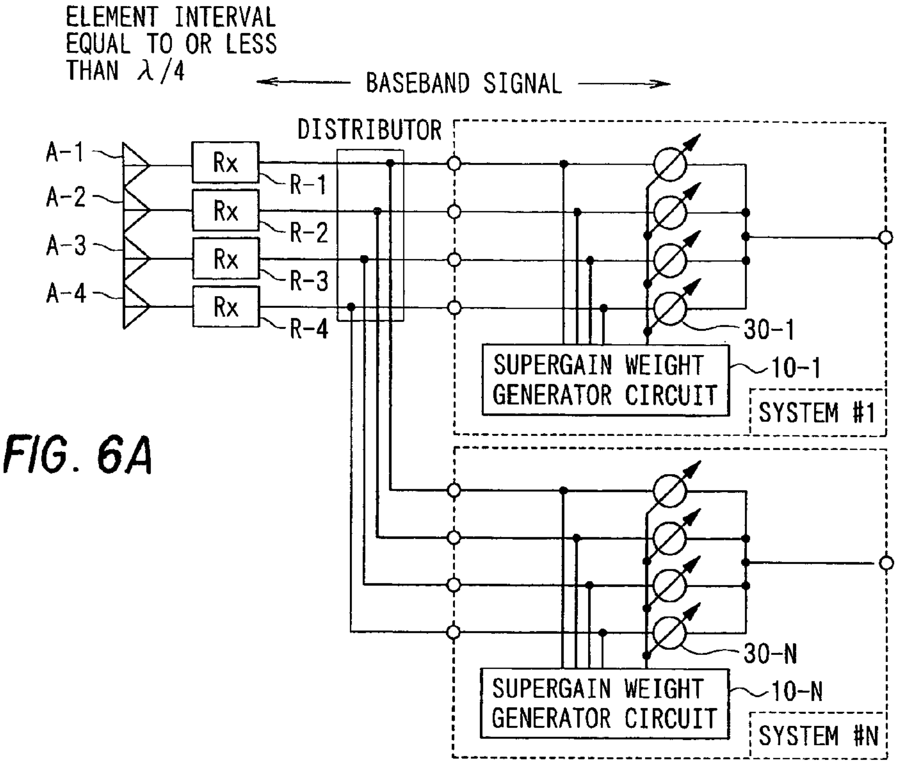
FIG. 6(*a*) is a block diagram showing a second embodiment of the supergain array antenna system according to the invention, FIG. 6(*b*) shows a directivity pattern thereof, and FIG. 6(*c*) shows a return loss characteristic thereof.

FIG. 6(*a*) shows a configuration of a second embodiment of the supergain array antenna system according to the invention. In this embodiment also, an array antenna of an element interval equal to or less than λ/4 is used. This embodiment differs from the first embodiment (see FIG. 1) in that the baseband digital signals of the elements are distributed among a plurality of systems of processors. In this embodiment, the signals are distributed among N systems #1–#N. The systems have their respective supergain weight generator circuits 10-1–10-N and their respective weighting units 30-1–30-N provided therein. The processings performed by the supergain weight generator circuits 10-1–10-N and the weighting units 30-1–30-N are the same as in the first embodiment described above.

With such an arrangement, a possible band of the antenna elements or receivers can be divided into a plurality of sub-bands, which can be allocated to the plurality of processors.

Figure 6B:
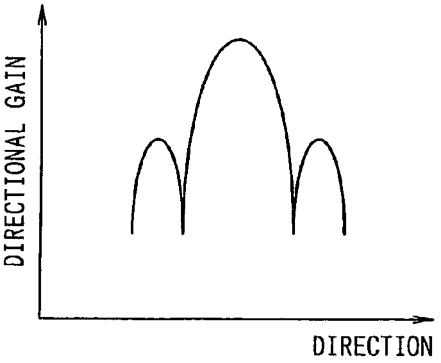
Figure 6C:
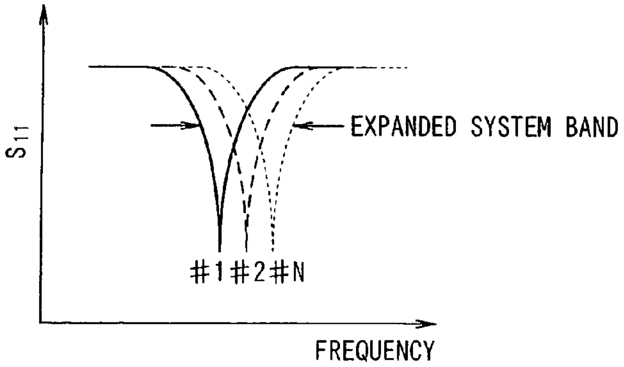

In short, according to this embodiment, the supergain synthesis circuit itself is arranged to serve as a narrow band filter. This arrangement realizes a widened band of the whole system as shown in FIGS. 6*b* and 6*c*.

(Third Embodiment)

Figure 7:
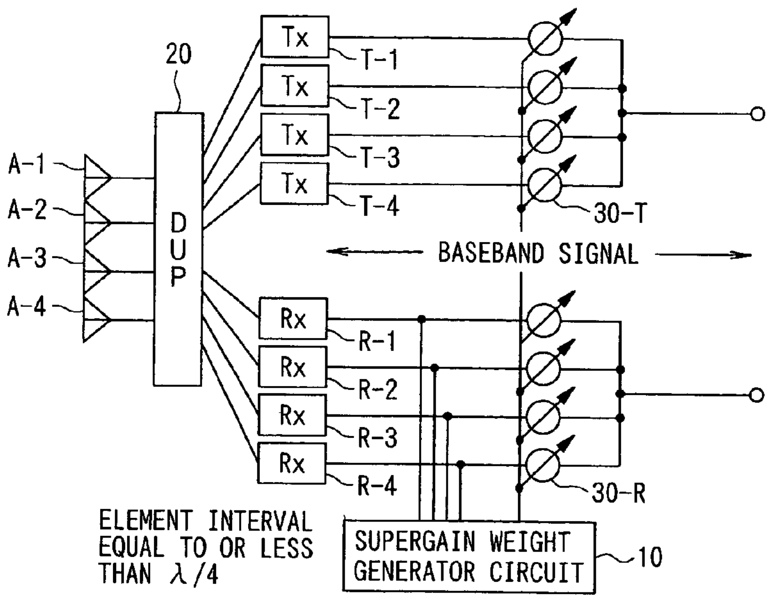
FIG. 7 is a block diagram showing a third embodiment of the supergain array antenna system according to the invention.

FIG. 7 shows a configuration of a third embodiment of the supergain array antenna system according to the invention. In this embodiment also, an array antenna of an element interval equal to or less than λ/4 is used. This embodiment differs from the first embodiment (see FIG. 1) in that there are additionally provided a duplexer 20 and a transmitter system comprising transmitters (Tx) T-1–T-4 and weighting units 30-T. That is, the antenna comprising the antenna elements A-1–A-4 is shared by the receiver system and the transmitter system. The processings performed by the supergain weight generator circuit 10 and the weighting units 30-T and 30-R are the same as in the first embodiment described above.

This arrangement enables supergain synthesis in transmission. Since the antenna is shared in this embodiment, the whole system having the receiver system and the transmitter system can be downsized without increasing the number of antenna elements.

(Fourth Embodiment)

Figure 8:
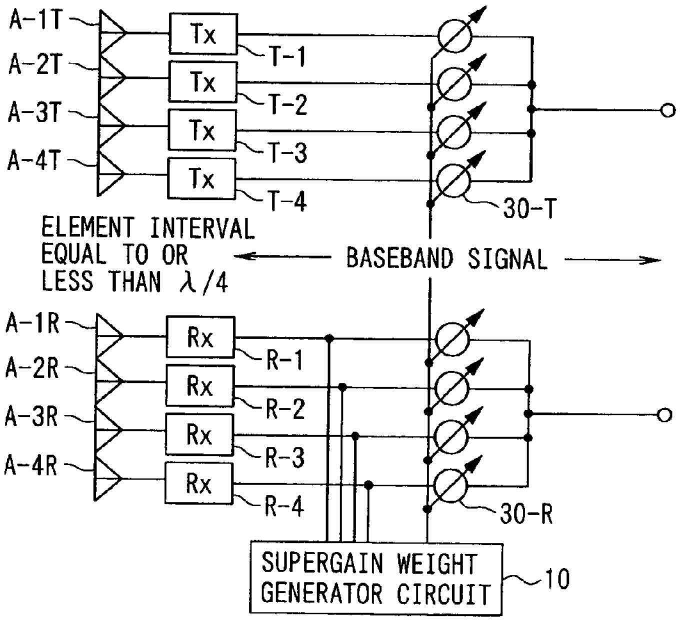
FIG. 8 is a block diagram showing a fourth embodiment of the supergain array antenna system according to the invention.
Figure 9A:
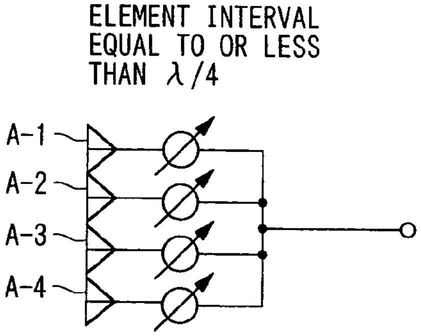
FIG. 9(*a*) is a block diagram showing a general configuration of an array antenna, FIG. 9(*b*) shows a directivity pattern thereof, and FIG. 9(*c*) shows a return loss characteristic thereof.
Figure 9B:
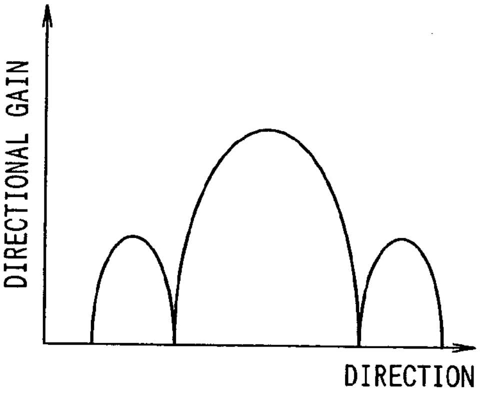
Figure 9C:
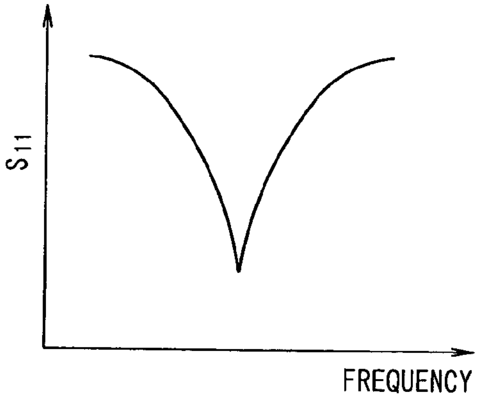
Figure 10:
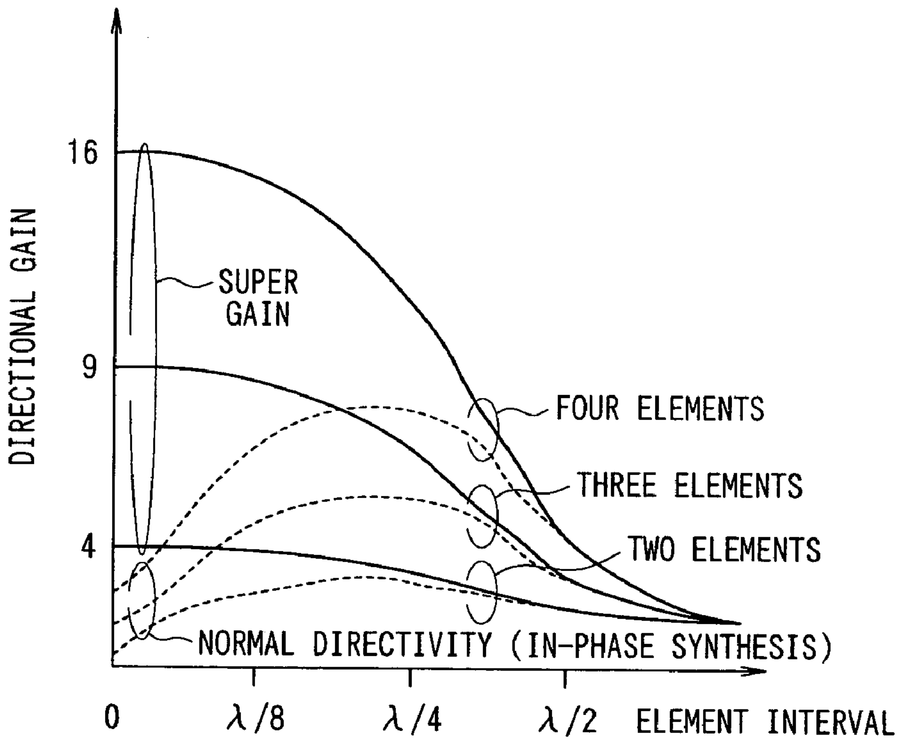
FIG. 10 is a graph showing, for supergain array antennas, relations between an element interval and an directional gain thereof.
Figure 11A:
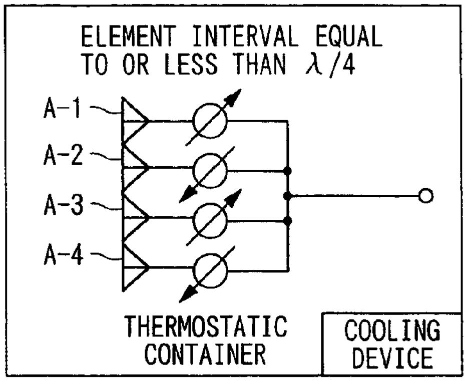
FIG. 11(*a*) is a block diagram showing a configuration of a supergain synthesis antenna, FIG. 11(*b*) shows a directivity pattern thereof, and FIG. 11(*c*) shows a return loss characteristic thereof.
Figure 11B:
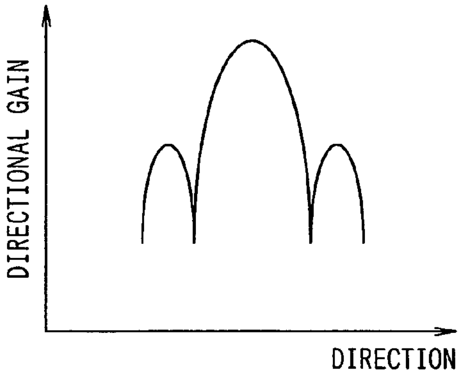
Figure 11C:
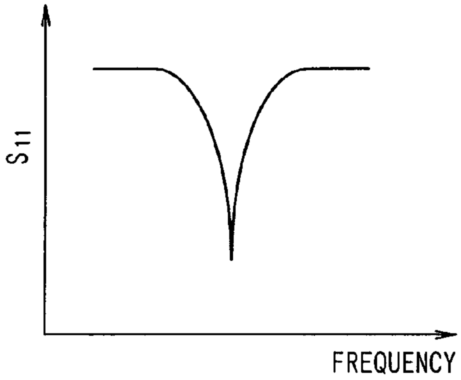

FIG. 8 shows a configuration of a fourth embodiment of the supergain array antenna system according to the invention. In this embodiment also, an array antenna of an element interval equal to or less than λ/4 is used. This embodiment differs from the first embodiment (see FIG. 1) in that a receiver system having antenna elements A-1R–A-4R and a transmitter system having antenna elements A-1T–A-4T are provided separately, and the supergain weight generator unit 10 is shared by the systems. The processings performed by the supergain weight generator circuit 10 and the weighting units 30-T and 30-R are the same as in the first embodiment described above.

This arrangement enables supergain synthesis in transmission. Since the supergain weight generator circuit is shared in this embodiment, the whole system having the receiver system and the transmitter system can be downsized without increasing the number of the same circuits.

The supergain array antenna system described above adopts a method for controlling a supergain array antenna as follows. That is, the method is to control an array antenna comprising a plurality of antenna elements and having an element interval that provides a supergain and comprises a weight generating step of generating weight data in accordance with each of directivity data for the plurality of antenna elements of the array antenna, and a weighting step of using the weight data generated in the weight generating step to weight the plurality of antenna elements of the array antenna. Here, the element interval that provides a supergain is equal to or less than a quarter of a wavelength of a signal received and/or transmitted.

In the weigh generating step, weight data that maximizes the signal-to-noise ratio is generated. In the weight generating step, calibration for the plurality of antenna elements, storage of directivity data resulting from the calibration, and weight calculation in which the weight data is calculated by referring to the stored directivity data are performed.

If the control method is adopted, a multi-element and wide-band supergain array antenna can be provided by digital beam synthesis.

Besides the description in the claims, the present invention includes the following aspects.

(1) An antenna apparatus that provides a supergain by digital beam synthesis, comprising an array antenna having elements spaced at intervals that provide a supergain, receivers connected to the respective elements, a device that records and accumulates therein element directivity data for each element, and a supergain synthesis circuit.

(2) An antenna apparatus that provides a supergain by digital beam synthesis, comprising an array antenna having elements spaced at intervals that provide a supergain, a distributor for distributing an output of the antenna, receivers connected to the respective elements, a device that records and accumulates therein element directivity data for each element, and a supergain synthesis circuit.

(3) The antenna apparatus described in (1), further comprising, for each element, a duplexer and a transmitter connected thereto.

(4) The antenna apparatus described in (1), further comprising an array antenna dedicated for transmission and having elements spaced at intervals that provide a supergain, and a transmitter connected thereto.

As described above, according to the invention, weight data is generated in accordance with phase difference and amplitude difference between a plurality of antenna elements spaced at intervals that provide a supergain and directivity data thereof, and the generated weight data is used to weight each of the antenna elements, whereby a multi-element supergain array antenna that has conventionally been impossible can be advantageously provided. In addition, if a plurality of systems of this arrangement is provided for the antenna elements, an antenna system that can be applied to a wide band communication system is advantageously provided. Furthermore, if the antenna for transmission and the antenna for reception are integrated, or if generation and weighting of the weight data are performed in a common arrangement, the whole system can be advantageously downsized.

What is claimed is:

1. A supergain array antenna system having an array antenna, the array antenna comprising a plurality of antenna elements and having an element interval that provides a supergain, the supergain array antenna system comprising:

weight generator means for generating weight data in accordance with each of directivity data for the plurality of antenna elements of said array antenna; and weighting means for using the weight data generated by the weight generator means to weight the plurality of antenna elements of said array antenna, wherein said element interval is equal to or less than a quarter of wavelength of a signal received and/or transmitted, and said weight generator means comprises an element directivity data memory which stores said directivity data, obtained by measuring a phase difference and an amplitude difference between said antenna elements, as directivity patterns indicating an angle with the lateral axis and a directional gain with the longitudinal axis, and a supergain weight generator unit which generates said weight data by referring to the stored directivity data.

2. The supergain array antenna system according to claim 1, wherein said weight generator means generates weight data that maximizes a signal-to-noise ratio.

3. The supergain array antenna system according to claim 1, wherein said weight generator means performs calibration for the plurality of antenna elements, storage of directivity data resulting from the calibration, and weight calculation in which said weight data is calculated by referring to the stored directivity data.

4. The supergain array antenna system according to claim 1, wherein a signal system for said array antenna is separated into a plurality of sub-systems, and said weight generator means is provided for each of the plurality of signal sub-systems.

5. The supergain array antenna system according to claim 1, wherein a signal system for said array antenna is separated into a transmission signal sub-system and a reception signal sub-system, and said weight generator means is shared by the separate transmission signal sub-system and reception signal sub-system.

6. The supergain array antenna system according to claim 1, wherein said array antenna is provided for each of transmission and reception, and weight data generated by the weight generator means shared by the array antennas is used to weight a plurality of antenna elements of the array antennas.

7. A method for controlling a supergain array antenna comprising a plurality of antenna elements and having an element interval that provides a supergain, the method comprising:

a weight generating step of generating weight data in accordance with each of directivity data for the plurality of antenna elements of said array antenna; and a weighting step of using the weight data generated in the weight generating step to weight the plurality of antenna elements of said array antenna, wherein said element interval is equal to or less than a quarter of a wavelength of a signal received and/or transmitted, and said weight generating step comprises a storing step of directivity data, obtained by measuring a phase difference and an amplitude difference between said antenna elements, as directivity patterns indicating an angle with the lateral axis and a directional gain with the longitudinal axis, and a generating step of said weight data by referring to the stored directivity data.

8. The method for controlling a supergain array antenna according to claim 7, wherein said element interval that provides a supergain is equal to or less than a quarter of a wavelength of a signal received and/or transmitted.

9. The method for controlling a supergain array antenna according to claim 7 or 8, wherein in said weigh generating step, weight data that maximizes a signal-to-noise ratio is generated.

10. The method for controlling a supergain array antenna according to claim 7 or 8, wherein in said weight generating step, calibration for the plurality of antenna elements, storage of directivity data resulting from the calibration, and weight calculation, in which said weight data is calculated by referring to the stored directivity data, are performed.

11. The method for controlling a supergain array antenna according to claim 9, wherein in said weight generating step, calibration for the plurality of antenna elements, storage of directivity data resulting from the calibration, and weight calculation, in which said weight data is calculated by referring to the stored directivity data, are performed.

* * * * *